(12) United States Patent
Ishihara et al.

(10) Patent No.: US 7,728,284 B2
(45) Date of Patent: Jun. 1, 2010

(54) METHOD OF MANIPULATING NANOSIZE OBJECTS AND UTILIZATION THEREOF

(75) Inventors: Hajime Ishihara, Minoh (JP); Takuya Iida, Miki (JP)

(73) Assignee: Japan Science & Technology Agency, Saitama (JP)

( * ) Notice: Subject to any disclaimer, the term of this patent is extended or adjusted under 35 U.S.C. 154(b) by 541 days.

(21) Appl. No.: 11/661,656

(22) PCT Filed: Mar. 3, 2005

(86) PCT No.: PCT/JP2005/003637

§ 371 (c)(1), (2), (4) Date: Mar. 1, 2007

(87) PCT Pub. No.: WO2006/027863

PCT Pub. Date: Mar. 16, 2006

(65) Prior Publication Data

US 2007/0284544 A1    Dec. 13, 2007

(30) Foreign Application Priority Data

Sep. 3, 2004    (JP) .............................. 2004-257017

(51) Int. Cl.
*H01S 4/00*    (2006.01)
*G21K 5/02*    (2006.01)

(52) U.S. Cl. ..................................... 250/251; 209/579

(58) Field of Classification Search .................. 250/251; 438/22; 209/579, 586, 576, 585, 309, 311, 209/318; 977/858, 872, 880, 889
See application file for complete search history.

(56) References Cited

U.S. PATENT DOCUMENTS

2003/0183560 A1* 10/2003 Hannah ...................... 209/579

FOREIGN PATENT DOCUMENTS

| JP | 05-168265 A | 7/1993 |
|----|-------------|--------|
| JP | 2003-200399 | 7/2003 |
| JP | 2003-200399 A | 7/2003 |

OTHER PUBLICATIONS

Ng et al., "Manipulation of colloidal gold nanoparticles in the evanscent field of a channel waveguide", Appled Physics Letters vol. 76(15), 2000, pp. 1993-1995.*

Miyakawa et al., "Rotation of two-dimensional arrays of microparticles trapped by circularly polarized light" Applied Physics Letters, vol. 84, No. 26, Jun. 28, 2004.

Iida et al., "Theoretical Study of the Optical Manipulation of Semiconductor Nanoparticles under an Excitonic Resonance Condition" Physical Review Letters, vol. 90, No. 5, Feb. 7, 2003.

(Continued)

*Primary Examiner*—David A Vanore
*Assistant Examiner*—Nicole Ippolito Rausch
(74) *Attorney, Agent, or Firm*—Harness, Dickey & Pierce, P.L.C.

(57) ABSTRACT

Light resonant with an electronic excitation level of nanosize objects is projected onto a plurality of closely located nanosize objects, such as quantum dots, quantum dot pairs, and a carbon nanotube, in a collection of nanosize objects is disclosed. In so doing, to control the mechanical interaction induced between the nanosize objects, the projected resonant light is changed in polarization. This enables the collective manipulation of the nanosize objects.

20 Claims, 6 Drawing Sheets

OTHER PUBLICATIONS

M. Bayer et al., "Coupling and Entangling of Quantum States in Quantum Dot Molecules" Science, vol. 291, pp. 451-453, Jan. 19, 2001.

Oosterkamp et al., "Microwave spectroscopy of a quantum-dot molecule" Letters to Nature, vol. 395, Oct. 29, 1998.

Crooker et al., "Spectrally Resolved Dynamics of Energy Transfer in Quantum-Dot Assemblies: Towards Engineered Energy Flows in Artificial Materials" Physical Review Letters, vol. 89, No. 18, Oct. 28, 2002.

Burns et al., "Optical Binding" Physical Review Letters, vol. 63, No. 12, Sep. 18, 1989.

Burns et al., "Optical Matter: Crystallization and Binding in Intense Optical Fields" Science, vol. 249, Aug. 17, 1990.

Tatarkova et al., "One-Dimensional Optically Bound Arrays of Microscopic Particles" Physical Review Letters, vol. 89, No. 28, Dec. 31, 2002.

McGloin et al., "Optically bound microscopic particles in one dimension" Physical Review, E. 69 (2004).

Japanese Office Action dated Jul. 7, 2009 issued in corresponding Application No. JP 2006-535025 and English translation thereof.

D. Porras and J.I. Cirac, "Effective Quantum Spin Systems with Trapped Ions," Physical Review Letters, May 21, 2004, vol. 92, No. 20, pp. 207901-1-207901-4.

Olga Smirnova et al., "Molecule without Electrons: Binding Bare Nuclei with Strong Laser Fields," Physical Review Letters, Jun. 20, 2003, vol. 90, No. 24, pp. 243001-1-243001-4.

Takuya Iida et al., "Utilization of Electronic Resonance Level in the Optical Manipulation-Enhancement of Radiation Pressure by the Cavity Effect-," Physical Review Letters, Feb. 27, 2004, vol. 92, No. 8, pp. 089702-1.

Takuya Iida et al., "Utilization of Electronic Resonance Level in the Optical Manipulation-Enhancement of Radiation Pressure by the Cavity Effect-," Proceedings of Tenth Near-Field Optics Research Group Conference, 2001, pp. 49-52 (with English translation).

Comment on "Theoretical Study of the Optical Manipulation of Semiconductor Nanoparticles Under an Excitonic Resonance Condition", Physical Review Letters, vol. 92, No. 8, p. 89701-1, (Feb. 27, 2004).

Iida and Ishihara Reply, Physical Review Letters, vol. 92, No. 8, p. 89702-1, (Feb. 27, 2004).

Takuya Iida et al., "Utilization of Electronic Resonance Level in the Optical Manipulation-Enhancement of Radiation Pressure by the Cavity Effect-," Physical Review Letters, Feb. 27, 2004, vol. 92, No. 8, pp. 49-52.

\* cited by examiner

METHOD OF MANIPULATING NANOSIZE OBJECTS AND UTILIZATION THEREOF

TECHNICAL FIELD

The present invention relates to a method of manipulating nanosize objects and the utilization of the method, in particular to a manipulation method suitable for the manufacture (production), manipulation, etc. of quantum dot pairs, as well as the utilization of the method.

BACKGROUND ART

The force exerted on a material under light irradiation is called the radiation force. The force is used in optical manipulation to control the 3-dimensional position and dynamic motion of a fine object. A specific example is optical manipulation of micrometer-sized fine objects floating in a fluid medium. It is expected that the force will be exerted also in nanotechnology.

It was difficult, however, to apply the radiation force-based optical manipulation in the field of nanotechnology with conventional techniques. A specific cause which makes it difficult to optically manipulate nanosize objects is insufficient radiant force. Nanotechnology deals with a nanomaterial (objects, particles, or structures, each of a few hundreds of nanometers or smaller). Non-metal nanomaterials, under ordinary conditions, show too small induced polarization to produce sufficient radiation force for the control of the motion of the nanometer-sized objects by light irradiation.

On the other hand, it is known that shining a laser beam at a frequency resonant with an electronic excitation level of the target material (resonant light) enhances induced polarization, hence achieving strong radiation force. The principles are utilized in laser cooling and capture of atoms.

The nanomaterial is also known to exhibit characteristics which are derived from the fact that its quantum-mechanical properties change with its size (dimensions), shape, internal structure, quality, etc. unlike micrometer-sized materials and atoms.

The inventors of the present invention, in view of this knowledge, have conducted theoretical studies of the radiation force exerted on nanosize objects under resonant light irradiation, as well as its quantum-mechanical effects, which has led to the following findings:

(1) Advantages in exploiting electronic resonance effects increase tremendously with decreasing size. For example, the force exerted on about 10-nm objects under certain conditions increases, due to the resonance effects, at least four orders of magnitude in comparison to the case without the resonance effects. Under a certain condition in the presence of resonance effects, weak incident light which would produce only a linear response can induce a force greater than gravity by a few orders of magnitude.

(2) Nano objects of about a few tens of nanometers in size go through a coherent scattering process in which excitation energy dissipates through radiation more quickly than in a thermal absorption process. Manipulation entailing almost no heat generation may become possible by using the process.

(3) Peak positions of force in a frequency spectrum shift highly sensitively in response to changes in size on the order of nanometers due to quantum size effects.

Accordingly, the inventors of the present invention, in view of this knowledge, proposed a novel optical manipulation technique which exploits the fact that the radiation force, induced when nanosize objects are illuminated with resonant light, changes with the quantum-mechanical characteristics of individual nanosize objects, in order to selectively manipulate nanosize objects of particular nature (see non-patent document 1 and patent document 1).

A so-called "quantum dot" is an example of an optically manipulable nanosize object. The quantum dot is frequently referred to as the artificial atom because its electronic excitation levels are discrete like those of an atom.

Although current quantum dot research is still in its fundamental stage, it is known that the quantum dot has high quantum efficiency and is easy to use as a device because the dot can be formed of a semiconductor or similar unique material. The quantum dot is expected to find applications in a variety of fields, such as high efficiency light emitting devices, high speed optical communications, quantum communications, and biotechnology. Recently, there are a lot of studies, especially, of electrical and optical properties of semiconductor quantum dots in which an electron system is confined. Focus is not only on single quantum dots, but also on quantum-mechanical coupling between a plurality of quantum dots.

For example, coherent bonding and antibonding states of electrons in an excited state are observed between quantum dot pairs. Such a pair of quantum dots is termed an artificial molecule or quantum dot molecule (see non-patent documents 2, 3). In the artificial molecule, the electrons confined in individual quantum dots are quantum-mechanically entangled. Thus, if a device is fabricated which contains large numbers of arrays of the artificial molecules, that device will likely be developed into quantum computers and find other applications.

There are also attempts to control energy transfer between quantum dots (see non-patent document 4). The energy transfer control will enable efficient energy transfer and may contribute to solution to energy problems.

The following is the list of the documents mentioned above:

Patent Document 1: Japanese Unexamined Patent Publication (Tokukai) 2003-200399 (published Jul. 15, 2003).

Non-patent Document 1: T. Iida, H. Ishihara, Phys. Rev. Lett., Vol. 90, 057403, pp. 1-4 (Feb. 7, 2003).

Non-patent Document 2: M. Bayer, P. Hawrylak, K. Hinzer, S. Fafarad, M. Korkusinsi, Z. R. Wasilewski, O. Stern, A. Forchel, Science, Vol. 291, 451 (2001).

Non-patent Document 3: T. H. Oosterkamp, T. Fujisawa, W. G. van der Wiel, K. Ishibashi, R. V. Hijman, S. Tarucha, L. P. Kouwenhoven, Nature, Vol. 395, pp. 873-876 (1998).

Non-patent Document 4: S. A. Crooker, J. A. Hollingsworth, S. Tretiak, V. I. Klimov, Phys. Rev. Lett., Vol. 89, 186802, pp. 1-4 (Oct. 24, 2002).

These conventional techniques fall short of efficient manipulation of more than one nanosize objects with high degrees of freedom.

Specifically, for example, non-patent document 2 observes a quantum-mechanical bonding state of quantum dots formed in a layered structure of semiconductors by self-assembly. The technique utilizes effects of distortion which is in turn caused by different lattice constants of different semiconductors stacked by MBE or a similar method. The technique is capable of producing a large number of quantum dots at a time. Nevertheless, given a set of semiconductors, the positions of the dots are automatically determined.

Non-patent document 3 subjects layers of gallium arsenide (GaAs) and aluminum gallium arsenide (AlGaAs) to an insulation process by focused ion beam implantation. Quantum dots of 100 nm are made by applying voltage through a Schottky gate. It is presumably difficult to produce smaller quantum dots or in large quantities by this technique.

In the techniques described in non-patent documents 2, 3 and other literature, the quantum dots are fixed in position in the semiconductor stack. The quantum dots are not mechanically manipulable even by illuminating the quantum dots with light to excite the bonding or antibonding energy for electrons in an excited state. Once the quantum dots are formed, their positions are no longer freely controllable.

Non-patent document 4 deposits and fixes colloidal cadmium selenide (CdSe) quantum dots dispersed in an organic solvent on a glass substrate. The technique indeed mechanically manipulates the quantum dots in the organic solvent. Since the quantum dots are ultimately fixed to the substrate, however, it is difficult to control the diameters of the quantum dots, distances between the quantum dots, and other determining factors in energy transfer.

In contrast, by using the techniques disclosed in non-patent document 1 and patent document 1 developed by the inventors of the present invention, it is possible to form large numbers of nanosize objects with selected specific quantum-mechanical properties in free space, and to control their motion. The documents however left unanswered for future discussion the question of details of how to control the motion of the nanosize objects by means of light-induced force between the objects.

The present invention, conceived in view of the above problems, has an objective of providing a collective manipulation technique for nanosize objects, such as quantum dots or quantum dot pairs.

DISCLOSURE OF INVENTION

The inventors of the present invention, in view of the problems, have diligently worked and found that it is possible to control radiation force induced by illuminating resonant light on two closely located nanosize objects in a collection of nanosize objects freely floating and hence to control the spatial positions and motion of the two objects, by switching the light between polarization states, which has led to the completion of the invention.

A method of manipulating nanosize objects of the present invention, to solve the problems outlined above, is characterized as follows. The method involves illuminating nanosize objects with light resonant with an electronic excitation level of the nanosize objects to induce force being exerted on the nanosize objects from the resonant light for manipulation of the nanosize objects. The resonant light illuminates a collection of nanosize objects. The resonant light is changed in polarization to control mechanical interaction of the nanosize objects.

In the method, the collection should be either in free space or in a fluid medium. The resonant light may be changed in intensity.

According to the method, if the resonant light is changed in polarization so as to excite the resonance energy of closely positioned nanosize objects to a level below the resonance energy of a single nanosize object, an attractive force arises between the nanosize objects. Also, if the resonant light is changed in polarization so as to excite the resonance energy of closely positioned nanosize objects to a level above the resonance energy of a single nanosize object, a repulsive force arises between the nanosize objects. The resonant light may illuminate the nanosize objects under different sets of conditions together.

A specific example of the method above is an arrangement involving step (a) of illuminating the nanosize objects in the collection of nanosize objects with the resonant light for manipulation of the objects, so as to control a collective motion and/or arrangement of the nanosize objects. The example may further involve step (b) of illuminating the nanosize objects in the collection of nanosize objects with resonant light for manipulation of the objects, so as to control the position of the center of mass and/or motion of the nanosize objects of which the motion and/or arrangement are either already under control or in the process of bringing under control.

In the method, the collection of nanosize objects may contain a plurality of types of nanosize objects, and the method may further involve step (c) of illuminating the nanosize objects with the resonant light to select particular nanosize objects from the collection of nanosize objects. The method may further involve step (d) of forming the collection of nanosize objects. Step (d) is, for example, the formation of the collection of nanosize objects with focused light.

The present invention is not limited in any particular manner in terms of the nanosize objects it aims to manipulate. The objects are, for example, quantum dots or quantum dot pairs. In those cases, if the collection of nanosize objects contains a plurality of types of quantum dot pairs having different electronic excitation levels, those nanosize objects with a particular electronic excitation level are selectable in step (c). Also, if the collection of nanosize objects contains a plurality of types of quantum dot pairs of the same material, but differing in at least one of size, shape, and internal structure, those quantum dot pairs with substantially the same size, shape, and internal structure are selectable in step (c).

The collection of nanosize objects formed in step (d) may be a collection of quantum dots with particular properties. The distances separating quantum dots in the collection of quantum dots may be controlled to form a quantum dot pair in step (a).

In the method, the resonant light is preferably a laser beam.

The present invention encompasses a method of producing a quantum dot pair involving the method of manipulating nanosize objects detailed above.

A device of manipulating nanosize objects of the present invention is characterized as follows. The device illuminates nanosize objects with resonant light to exert a force on the nanosize objects to manipulate the nanosize objects. The device contains resonant light projection means for illuminating the nanosize objects with light resonant with an electronic excitation level of the nanosize objects. The resonant light projection means is capable of changing the resonant light in polarization.

The device preferably further contains an enclosure equipped with an internal space to accommodate the collection of nanosize objects for manipulation. The enclosure can be loaded with a fluid medium, for example.

In the device, the resonant light projection means preferably is capable of changing the resonant light in intensity. More preferably, the device contains a plurality of the resonant light projection means, and the plurality of the resonant light projection means illuminate the nanosize objects with the resonant light under different sets of conditions together.

The device may further contain nanosize-object-collection forming means for forming the collection of nanosize objects, the forming means being provided inside the enclosure. Also, the device may further contain a substrate for fixing the nanosize objects after manipulation, the substrate being provided inside the enclosure.

The method of manipulating nanosize objects of the present invention, as described in the foregoing, is arranged to change the resonant light projected onto the nanosize objects in its polarization (handedness in the oscillation direction of the electric field of the resonant light). Thus, an attractive force or a repulsive force is created between the nanosize objects by controlling the polarization of resonant light. An attractive force arising between the nanosize objects brings the objects closer to each other or causes the objects to assemble into an aggregate. A repulsive force arising between the nanosize objects moves the objects away from each other or prevents the objects from assembling into an aggregate.

Thus, irradiating double nanosize objects with changeable, polarized, resonant light creates controllable radiation force between the nanosize objects, making it possible to control the spatial positions and motion state of the collection of nanosize objects. That enables collective manipulation of the nanosize objects. Also, in combination with a conventional manipulation technique, the nanosize objects can be manipulated more efficiently and more freely.

Additional objects, advantages and novel features of the invention will be set forth in part in the description which follows, and in part will become apparent to those skilled in the art upon examination of the following or may be learned by practice of the invention.

BEST MODE FOR CARRYING OUT THE INVENTION

Figure 1A:
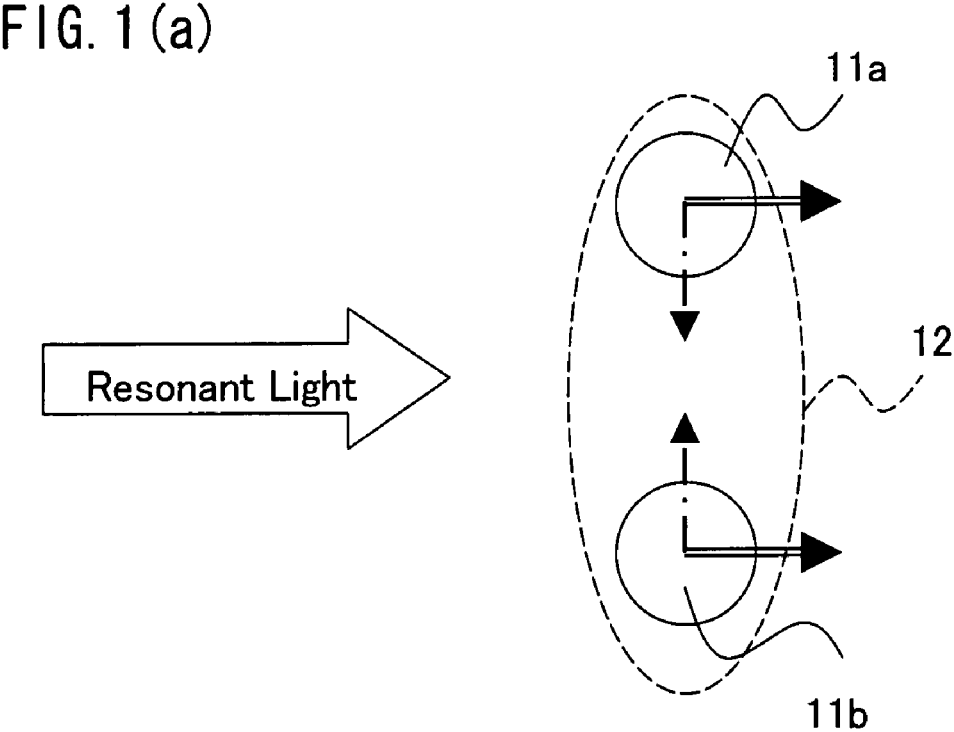
FIG. 1(a): A schematic illustration of the structure of a quantum dot pair and the force exerted by resonant light, as an example of a nanosize object of the present invention. The force exerted is an attractive force.

The following will describe an embodiment of the present invention. This is by no means limiting the present invention.

[1] Nanosize Objects Manipulation Method

A method of manipulating nanosize objects of the present invention illuminates a collection of nanosize objects in an environment where the objects can move freely with light resonant with an electronic excitation level of the objects, so as to induce force between the objects and thereby control the spatial positions and motion state of the objects.

Nanosize Objects & Collection of Nanosize Objects

The nanosize objects of the present invention are not limited in any particular manner, provided that their size is a few hundreds of nanometers or smaller. The objects may be of any shape. The nanosize objects can be referred to as nanoparticles since they are nanoscale fine objects or as nanoscale structures if structure has its own feature. The nanosize objects have sizes on the order of nanometers and preferably have radii of 100 nm or less. For the nanosize object with a 100 nm or less radius, the magnitude of force exerted in the presence of resonance is enhanced by about $10^2$ to $10^5$ times over that in the absence of resonance.

The collection of nanosize objects is not limited in any particular manner, provided that it is a system of two or more nanosize objects. Especially, in the present invention, it can be any collection of nanosize objects so closely packed that adjacent objects can interact under resonant light irradiation.

Examples of nanosize objects preferred in the present invention are quantum dots and quantum dot pairs. A quantum dot measures typically from a few to a few hundreds of nanometers. It can be a structure of a semiconductor, a metal, an organic compound, etc. The quantum dot is not limited in any particular manner, provided that it is a system exhibiting quantum-mechanical effects. The quantum dots are semiconductors in the examples of the invention which will be detailed later. Semiconductors are preferred because strong radiation force is available with them. It is assumed, for example, that the semiconductor has in it excitons and other electronic states which show strong resonance and hence produces strong radiation force under a laser beam at frequencies corresponding to that state.

Two quantum dots can pair up to form a quantum dot pair in which the dots are separated by a distance of a few to a few tens of nanometers. The quantum dot pair is by no means limited in any particular manner, provided that it forms such a closely packed structure by pairing up with another quantum dot. An artificial molecule, a quantum dot molecule, and a polaritonic molecule are a few examples of quantum dot pairs. The present invention is able to make a quantum dot pair from quantum dots.

Preferred semiconductors include I-VII compound semiconductors, II-VI compound semiconductors, III-V compound semiconductors, and silicon (Si), but are not limited in any particular manner. A concrete example of the I-VII semiconductor is copper compounds, or more concretely, copper halides such as CuCl, CuBr, and CuI. CuCl is used in the examples of the invention which will be detailed later. Examples of the II-VI compound semiconductor include cadmium compounds such as CdS and CdSe and zinc compounds such as ZnO. Examples of the III-V compound semiconductor include gallium compounds such as GaAs.

Preferred among these compounds are the I-VII compounds and the II-VI compounds, between which the I-VII compounds are more preferred. Generally, an electron-hole pair forms an exciton, an example of a resonance level, in semiconductors. The eigenenergy of an exciton depends on the size of the quantum dot. This effect is exploitable: quantum dots of a particular size become selectable by choosing light resonant with that quantum dot size.

Other preferred examples of nanosize objects in the present invention include the carbon nanotube and a pair of carbon nanotubes. A pair of parallel carbon nanotubes are as well manipulable under resonant light irradiation as are a quantum dot pair.

The environment in which the collection of nanosize objects resides is not limited in any particular manner if the environment allows free movement of the individual nanosize objects, especially, if the environment allows nanosize object manipulation by the manipulation method of the present invention. Specific examples of such an environment are free space and fluid mediums.

Resonant Light

The light shone onto the collection of nanosize objects in the present invention is resonant with an electronic excitation level of the nanosize objects that is, resonant light.

An electronic excitation level refers to a quantum-mechanical, discrete energy level of the electron system of the nanosize object. The eigenenergy of the excitation level depends on the size, shape, and internal structure of the object. Shining light onto the object induces radiation force. The magnitudes and positions of peaks in a frequency spectrum of the radiation force changes with the size, shape, and internal structure of the object. The resonant light is resonant with an electronic excitation level: it has a center frequency corresponding to a peak position of the radiation force and consists of frequencies within twice the half width at half maximum for that peak.

That light (resonant light), shone onto a nanosize object, is resonant with the electronic excitation level. In other words, as the resonant light hits the nanosize object, it is resonant with energy difference, or transition energy, between the electronic excitation level and the ground level or between electronic excitation levels, and induces further polarization in the nanosize object. Generally, the more polarization is induced in a nanosize object, the more the nanosize object interacts with light. Therefore, the more polarization is induced in the nanosize object by incident resonant light, the more the nanosize object interacts mechanically with the light. Therefore, strong optical scattering and optical absorption occurs with the nanosize object, which in turn enables efficient transfer of force from the resonant light to the nanosize object.

Hence, the resonance between the light and the electronic excitation level of the nanosize object enhances the mechanical interaction even if the nanosize object shows weak mechanical interaction with the light. In short, the use of resonant light enhances the interaction of the nanosize object and the light and hence the force exerted on the nanosize object by the light. As a result, the force exerted on the nanosize object by the light is enhanced, making it possible to readily manipulate the nanosize object by the light being shone. Apart from that, the present invention is also capable of controlling mechanical interaction of nanosize objects by changing the polarization of resonant light (will be detailed later).

Given the material of the nanosize object, the wavelength of the resonant light can be determined from documented electronic excitation levels (see, for example, H. Ajiki and K. Cho, "Longitudinal and Transverse Components of Excitons in a Spherical Quantum Dot," Phys. Rev. B, Vol. 62, pp. 7402-7412 (2000)). The transition energy between electronic excitation levels of the nanosize object changes with the size, shape, internal structure, or quality of the nano object (detailed later). Therefore, if any of the material, size, shape, internal structure, etc. of the nanosize object to be manipulated is unknown, it is preferable to determine the energy difference between electronic excitation levels, size, shape, internal structure, etc. of the nanosize object by, for example, spectrometry and then determine the wavelength of the resonant light from the results of the spectrometry.

The resonant light is introduced to the nanosize object after being focused approximately to the wavelength. The spectrum of the resonant light has such a linewidth that the light is resonant with an electronic excitation level of the nanosize object to be manipulated. The resonant light shone onto the nanosize object should be of such an intensity that the light does not damage the object.

The type of the resonant light is not limited in any particular manner. A laser beam is preferably used. Specifically, any laser beam may be used at wavelengths from about 300 nm to about 1,200 nm, which is a typical wavelength range for optical manipulation lasers.

Control of Resonant Light

The resonant light is resonant with an electronic excitation level. The operation and effects of the light in optical manipulation are disclosed patent document 1. The inventors of the present invention have diligently worked on the technique described in patent document 1 and found on their own that the magnitude and sign of the radiation force acting between nanosize objects can be changed by changing the polarization of the resonant light. That is, the method of manipulating nanosize objects of the present invention involves, in particular, changing the polarization of the resonant light shone onto a collection of nanosize objects to control the mechanical interaction of the nanosize objects.

If there exist two nanosize objects $11a$ and $11b$ close to each other, in other words, if the objects $11a$ and $11b$ form a collection, 12, of nanosize objects, as shown in the examples of the invention and FIGS. 1(a) and 1(b) (detailed later), the induced internal polarization interacts through an electromagnetic field. As a result, bonding and antibonding states occurs with the nanosize objects on the basis of eigenenergy different from the electronic excitation levels of the single nanosize objects.

In the bonding state, the collection has a lower resonance energy than the resonance energy of a single nanosize object. In the antibonding state, the collection has a higher resonance energy than the resonance energy of a single nanosize object. The states can be selectively created with incident light having different polarization. Assuming a dual-particle system shown in FIGS. 1(a) and 1(b) being irradiated with resonant light, the radiation force induced by the resonant light is dependent on the direction of polarization with respect to the straight line which links the centers of mass of the nanosize objects $11a$ and $11b$ (for convenience, the "center-of-mass line"). Specifically, the nature of the created radiation force changes with the ratio of the parallel/vertical components of the polarized light. For example, the component parallel to the center-of-mass line induces attractive force and the component vertical to it induces repulsive force. Note that the incident resonant light parallel to the center-of-mass line has only a vertical component no matter how the polarization is varied; the radiation force is not dependent on the direction of the polarization.

Therefore, in the present invention, if the resonant light is changed in polarization so as to excite the resonance energy of the closely positioned nanosize objects to a level below the resonance energy of a single nanosize object, energy is excited so as to create a bonding state between the nanosize objects. As a result, as shown in FIG. 1(a), the attractive force indicated by the arrowheads with trailing dash-dot lines in the figure arises between the two nanosize objects $11a$ and $11b$.

If the resonant light is changed in polarization so as to excite the resonance energy of the closely positioned nanosize objects to a level above the resonance energy of a single nanosize object, energy is excited so as to create an antibonding state between the nanosize objects. As a result, as shown in FIG. 1(b), the repulsive force indicated by the arrowheads with trailing dash-double-dot lines in the figure arises between the two nanosize objects 11a and 11b.

The present invention is thus capable of freely inducing attractive or repulsive force between nanosize objects. The technique disclosed in patent document 1 enables manipulation of nanosize objects by shining resonant light, but falls short of efficient manipulation of a collection of nanosize objects. In contrast, by controlling the polarization of light, the present invention can bring nanosize objects closer to each other or cause the objects to assemble into an aggregate and conversely move the objects away from each other or prevent the objects from assembling into an aggregate. As a result, the invention enables control of the spatial positions and motion state of the nanosize objects in the collection of nanosize objects, achieving efficient manipulation of the nanosize objects with high degrees of freedom.

The magnitude of the force (attractive or repulsive) acting between the nanosize objects changes with the distance separating the nanosize objects. Also, the magnitude increases in proportion to the intensity of the resonant light shone. For example, the force acting between the nanosize objects has a magnitude about a few tens of times that of gravity if the nanosize objects are separated by a distance of a few to about a dozen nanometers and they are irradiated with a laser with a 50 $\mu$W/100 $\mu$m$^2$ (=50 w/cm$^2$) intensity. Accordingly, in illuminating the collection of nanosize objects with the resonant light, either the collection of nanosize objects should be formed so that the distance separating the nanosize objects can fall in a suitable range or the resonant light should be changed in intensity.

Figure 1B:
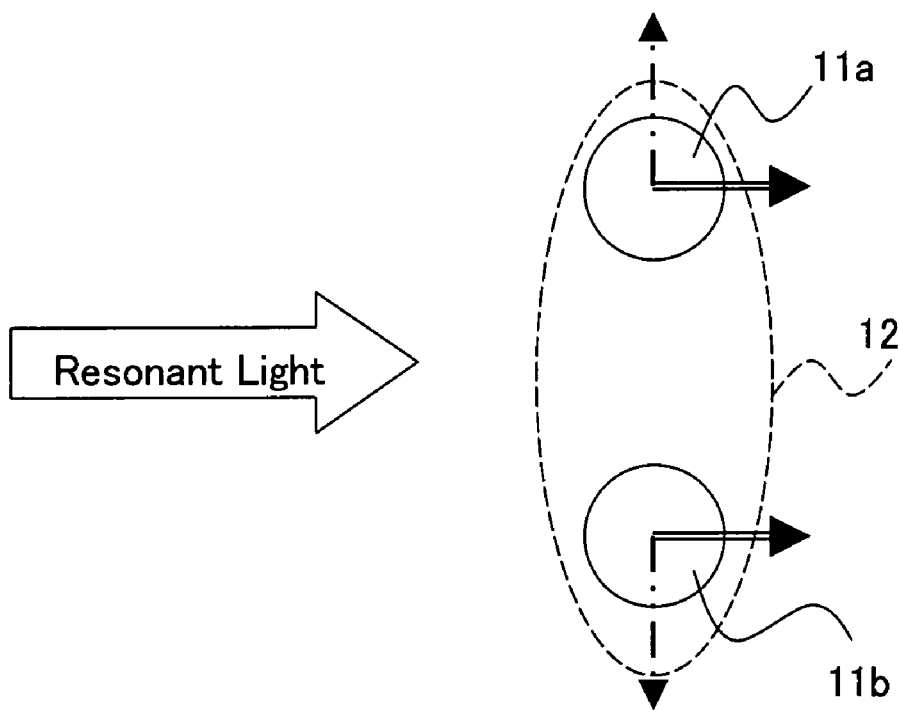
FIG. 1(b): A schematic illustration of the structure of a quantum dot pair and the force exerted by resonant light, as an example of a nanosize object of the present invention. The force exerted is a repulsive force.

Under resonant light irradiation, force arises not only between the nanosize objects 11a and 11b, but also in the traveling direction of the resonant light (indicated by double line arrows in the figure) as shown in FIGS. 1(a) and 1(b). This is exploitable. For example, an attractive or repulsive force is induced for the control of the positions and motion of the nanosize objects 11a and 11b (the collection, 12, of nanosize objects) by switching between polarizations (oscillation planes). That can be followed by the projection of the resonant light for the control of the position of the center of mass and the motion of the individual nanosize objects 11a and 11b. As to the sequence of the control of the positions and motion of the nanosize objects 11a and 11b and the control of the position and motion of the center of mass of the individual nanosize objects 11a and 11b under the resonant light, there are following possibilities: the former precedes the latter, the latter precedes the former, the former and latter are simultaneous, and the former and the latter are alternate.

In the present invention, the resonant light may be shone onto the collection of nanosize objects under different sets of conditions together. Using a plurality of types of resonant light together enables a greater variety of more complex manipulation of the nanosize objects. Major conditions include polarization (oscillation plane), intensity, and frequency which were discussed above. A plurality of types of resonant light (i.e., under different illuminating conditions) may be prepared in accordance with intended purposes. The plurality of types of resonant light may be emitted at any timing: they may be emitted simultaneously or alternately at different timings.

The present invention induces a desired attractive or repulsive force on the nanosize objects through polarization as outlined above. This will be explained in more detail.

Considering the force to be a function of light energy, the peak position of attractive force on the energy axis is slightly off the peak position of repulsive force on the energy axis. A peak is found in the higher energy region than the original resonance level of an exciton, that is, the resonance energy (peak radiation force) of a single nanosize object; the other peak is found in the low energy region. The shifts vary with parameters of the material.

Assume, as an example, that the nanosize objects are illuminated with polarized light oscillating in the vertical (up and down) direction. If the incident laser beam has such a wide linewidth that it covers both peaks, a repulsive force is induced between nanosize objects positioned side by side in the horizontal (left and right) direction, whereas an attractive force is induced between nanosize objects positioned side by side in the vertical direction. In contrast, if the laser beam has such a narrow linewidth that it covers only either of the peaks, the corresponding one of the forces is induced.

For example, if the incident laser beam is polarized oscillating in the vertical (up and down) direction and covers only the peak(s) above the resonance energy (peak radiation force) of a single nanosize object, a repulsive force can be induced between nanosize objects positioned side by side in the horizontal direction, whereas no force can be induced between nanosize objects positioned side by side in the vertical direction. On the other hand, if the incident laser beam is polarized oscillating in the vertical (up and down) direction and covers only the peak(s) below the resonance energy (peak radiation force) of a single nanosize object, an attractive force can be induced between nanosize objects positioned side by side in the vertical direction, whereas no force can be induced between nanosize objects positioned side by side in the horizontal direction.

By using the difference in peak position, an attractive or repulsive force is induced both between nanosize objects positioned side by side in the vertical direction and between nanosize objects positioned side by side in the horizontal direction as follows.

Two laser beams are prepared. If one is polarized oscillating in the vertical (up and down) direction and covers only the peak(s) below the resonance energy (peak radiation force) of a single nanosize object, an attractive force is induced between nanosize objects positioned side by side in the vertical direction, whereas no force is induced between nanosize objects positioned side by side in the horizontal direction. If the other is polarized oscillating in the horizontal direction and covers only the peak(s) below the resonance energy (peak radiation force) of a single nanosize object, an attractive force is induced between nanosize objects positioned side by side in the horizontal direction, whereas no force is induced between nanosize objects positioned side by side in the vertical direction. Thus, an attractive force is induced both between nanosize objects positioned side by side in the vertical direction and between nanosize objects positioned side by side in the horizontal direction.

On the other hand, if one is polarized oscillating in the vertical (up and down) direction and covers only the peak(s) above the resonance energy (peak radiation force) of a single nanosize object, a repulsive force is induced between nanosize objects positioned side by side in the horizontal direction, whereas no force is induced between nanosize objects positioned side by side in the vertical direction. If the other is polarized oscillating in the horizontal direction and covers only the peak(s) above the resonance energy (peak radiation force) of a single nanosize object, a repulsive force is included between nanosize objects positioned side by side in the vertical direction, whereas no force is induced between nanosize objects positioned side by side in the horizontal direction. Thus, a repulsive force is induced both between nanosize objects positioned side by side in the vertical direction and between nanosize objects positioned side by side in the horizontal direction.

This control of the linewidth and center frequency of the laser beam and combination of laser beams enables control of balance between the attractive and the repulsive force induced between the nanosize objects.

Specific Method of Manipulating Nanosize Objects

The method of manipulating nanosize objects of the present invention changes the polarization of the illuminating resonant light as above. A specific manipulation method making use of the basic principles will be now described. The manipulation method of the present invention is a comprehensive method for manipulating nanosize objects and involves a plurality of steps: a nanosize object manipulation step, a specific nanosize object selecting step ("step (c)"), and a collection forming step ("step (d)"), to name a few of them.

Two examples of the nanosize object manipulation step are (1) a first nanosize object manipulation step ("step (a)") of illuminating nanosize objects in a collection of nanosize objects with resonant light for the manipulation of the objects, so as to control the collective motion and/or arrangement of the nanosize objects; and (2) a second nanosize object manipulation step ("step (b)") of illuminating nanosize objects with resonant light for the manipulation of the objects, so as to control the position of the center of mass and/or motion of the individual nanosize objects of which the motion and/or arrangement are already under control. The manipulation method of the present invention involves at least the first nanosize object manipulation step and preferably the second nanosize object manipulation step.

As mentioned earlier, the collective motion, arrangement, etc. of numerous closely located nanosize objects are controllable by illuminating the collection of nanosize objects with resonant light having particular polarization to induce an attractive/repulsive force between the closely positioned nanosize objects in the collection of nanosize objects. This operation corresponds to the first nanosize object manipulation step.

Force arises in the traveling direction of the resonant light. Thus, the position of the center of mass and motion of the nanosize objects are controllable by illuminating the nanosize objects with the resonant light while maintaining the collection of nanosize objects after the control of the position and motion of the nanosize objects by changing the polarization. This operation correspond to the second nanosize object manipulation step.

Thus, the manipulation method of the present invention allows the two nanosize object manipulation steps to be implemented in various sequences: the first nanosize object manipulation step may precede the second nanosize object manipulation step, the second nanosize object manipulation step may precede the first nanosize object manipulation step, or steps (a) and (b) may take place alternately or simultaneously. The nanosize object manipulation method is hence widely applicable. Therefore, for example, the quantum dot pair can be produced in free space in the first nanosize object manipulation step, and the produced quantum dot pair may be transported and fixed to a substrate by the second nanosize object manipulation step.

The specific nanosize object selecting step allows for selection of particular nanosize objects from the collection of nanosize objects by illumination with the resonant light if the collection contains different types of nanosize objects. The selection of specific types of nanosize objects, in combination with the nanosize object manipulation step(s), renders the nanosize object manipulation method even more widely applicable.

Specifically, consider a collection of quantum dots (nanosize objects) as an example. The first nanosize object manipulation step can be used to form a quantum dot pair. Suppose that the collection of nanosize objects contains various types of quantum dot pairs.

If the plurality of types of quantum dot pairs in the collection of nanosize objects differ in electronic excitation level, the specific nanosize object selecting step can be used to select nanosize objects having a particular electronic excitation level through control of the resonant light. If the plurality of types of quantum dot pairs in the collection of nanosize objects are made of the same material, but differs in at least one of size, shape, and internal structure, the specific nanosize object selecting step can be used to select a quantum dot pair having a size, shape, or internal structure which matches predetermined conditions through control of the resonant light. The "predetermined conditions" here indicates that the size or shape of the quantum dot pair falls in such a range that the dots are separable from the collection of nanosize objects through illumination with the resonant light and that the internal structure of the quantum dot pair is similar, but sufficiently different to separate the pair from the rest of the collection through illumination with the resonant light. For convenience, the quantum dot pairs which match the predetermined conditions will be referred to as substantially identical quantum dot pairs. The resonant light can be controlled in the specific nanosize object selecting step based on the manipulation method disclosed in patent document 1. The manipulation method for fine objects disclosed in patent document 1 is hereby incorporated by reference.

The collection forming step forms the collection of nanosize objects. The collection of nanosize objects may be formed by any specific method. The collection of nanosize objects is formed, for example, by a focused beam. In a case like this, as mentioned above, the magnitude of the force (attractive or repulsive force) induced between the nanosize objects can be controlled through the illuminating resonant light if the distance between the nanosize objects in the collection of nanosize objects is controlled to fall in a desired range. In combination with changes in intensity of the illuminating resonant light, the magnitude of the force induced between the nanosize objects can be better controlled.

The collection of nanosize objects may be formed in any environment in the collection forming step, provided that the nanosize objects are freely movable. As mentioned earlier, specifically, it can be formed in free space or in a fluid medium. The fluid medium is not limited in any particular manner. Superfluid helium is an example.

The manipulation method of the present invention may involve any step other than the aforementioned nanosize object manipulation steps, the specific nanosize object selecting step, and the collection forming step. Also, the steps may be carried out in any sequence. For example, the nanosize object manipulation step(s), the specific nanosize object selecting step, and the collection forming step may be carried out in this sequence. Alternatively, the nanosize objects, totally dispersed in a fluid medium, may be subjected to the specific nanosize object selecting step, followed by the collection forming step in which the selected ones are packed within a certain distance and then the nanosize object manipulation step(s) in which the distances between the nanosize objects are controlled.

[2] Nanosize Object Manipulation Device

The manipulation device that implements the method of manipulating nanosize objects of the present invention is by no means limited in any particular manner provided that the device is capable of shining the resonant light to induce force on the nanosize objects for the manipulation of the nanosize objects. A specific example of the device configuration will be described in the following.

Figure 2:
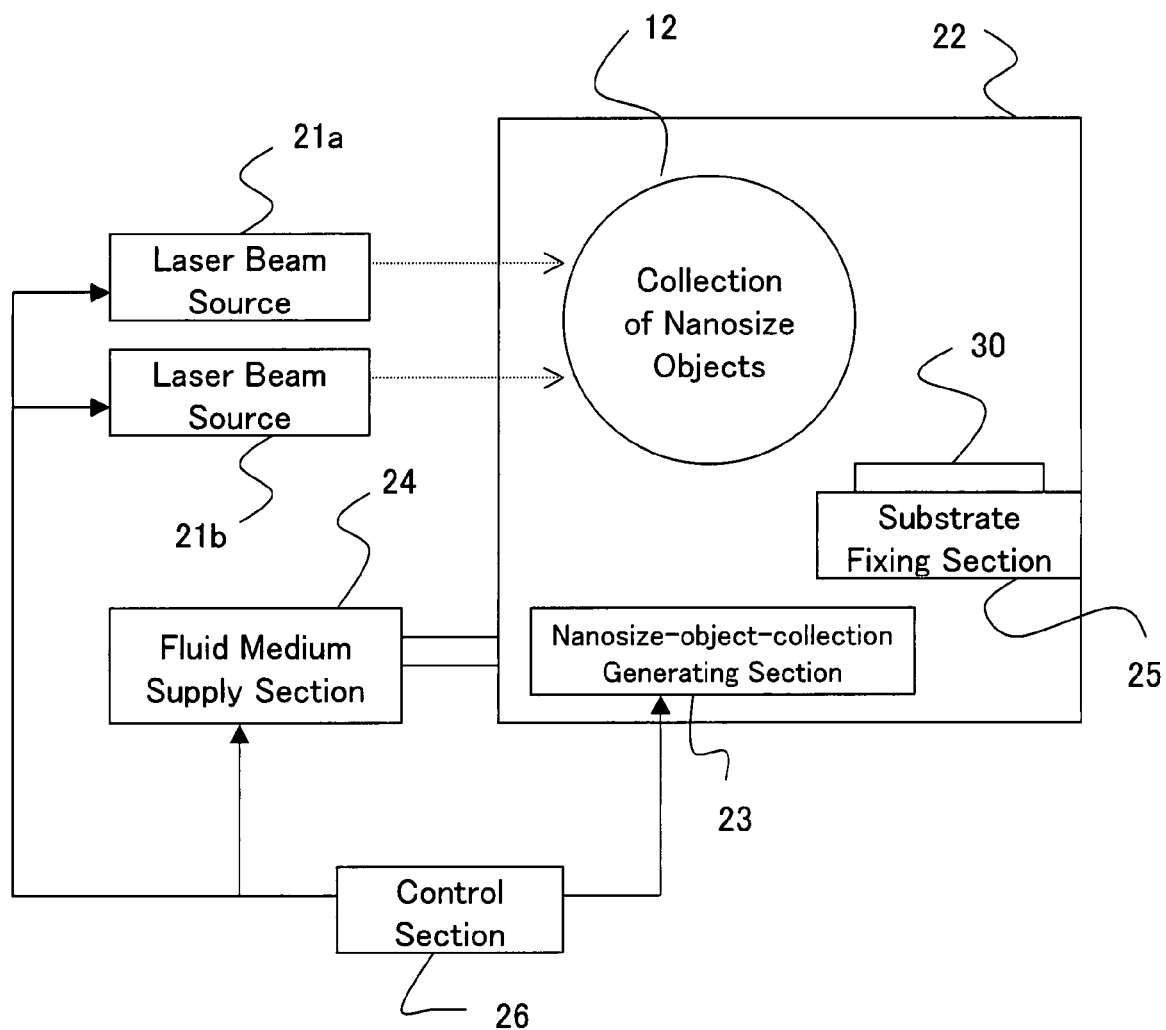
FIG. 2: A schematic diagram of a nanosize object manipulation device of the present invention, as an example.

First, as shown in FIG. 2, the manipulation device of the present embodiment contains laser beam sources 21a and 21b, an enclosure 22, a nanosize-object-collection generating section 23, a fluid medium supply section 24, a substrate fixing section 25, and a control section 26.

The laser beam sources 21a and 21b provide a resonant light projection means for illuminating the collection, 12, of nanosize objects with laser beams as the resonant light. The sources 21a and 21b are capable of emitting the resonant light under alterable conditions. Under the conditions, the resonant light can be altered at least in polarization and preferably also in wavelength and intensity as mentioned earlier under the heading "Control of Resonant Light" in [1].

The conditions can be changed so that they are suitable for intended purposes. For example, the conditions may be changed under the control of the control section 26 based on information on the nanosize objects that is fed through an external input device (for example, keyboard; not shown). Alternatively, if the material, size, shape, internal structure, etc. of the sample nanosize objects are unknown, there may be provided a spectrometer (not shown) by which to determine differences between electronic excitation levels, size, shape, internal structure, etc. of the nanosize objects. The conditions can be changed under the control of the control section 26 based on the measurements.

The number of the resonant light projection means is not limited in any particular manner. Two laser beam sources may be provided as in FIG. 2 (21a and 21b); either one of the sources may be provided; or three or more of them may be provided. The provision of two or more laser beam sources enables projection of resonant light (laser beams) under different sets of conditions together and hence a greater variety of more complex manipulation.

The laser beam sources 21a and/or 21b are not limited in specific structure in any particular manner: any publicly known laser beam source for use in nanosize objects manipulation can be used. A specific example is a laser beam source emitting in the near ultraviolet region if the sample nanosize objects are CuCl quantum dots. CuCl has an electronic excitation level in the near-ultraviolet region. A more specific example in the same situation is a blue-violet semiconductor laser element at a wavelength of 385±1 nm and an output power of 3 mW and with a linewidth of 0.05 nm. Another example is a wavelength-variable, mode-locked titanium: sapphire laser (the fundamental harmonic is from 720 nm to 900 nm; if LBO, $LiO_3$, or a similar non-linear optical crystal is used, the second harmonic is 360 to 450 nm). Techniques of changing the polarization or otherwise controlling the illuminating conditions are not limited in any particular manner either. Any publicly known laser optics may be used. For example, wave plates may be used to change the polarization. For example, the polarization of the laser beam is rotated 90° by using a half-wave plate.

The enclosure 22 has an internal space which accommodates the collection, 12, of nanosize objects in it for manipulation. The collection, 12, of nanosize objects are manipulated inside the enclosure 22 by the laser beam(s) (resonant light) emitted by the laser beam sources 21a and/or 21b. The enclosure 22 is not limited in size, shape, etc. in any particular manner: any enclosure of a suitable structure may be used in accordance with the types and manipulation environment for the nanosize objects (collection, 12, of nanosize objects). For example, to manipulate the collection, 12, of nanosize objects in superfluid helium or a similar fluid medium, a helium cryostat or similar enclosure which can house superfluid helium may be used.

The nanosize-object-collection generating section 23 forms the collection, 12, of nanosize objects. The section 23 may form the nanosize objects by itself before forming the collection 12. Alternatively, the nanosize objects may be introduced externally to the enclosure 22 and the section 23 forms the collection, 12, of nanosize objects using, for example, a focused beam. An example of the former configuration is to directly generate quantum dots in superfluid helium and convert the dots into the collection 12 under a focused beam. For details, see Japanese Patent Application (Tokugan) 2004-071621 (quantum dot manipulation method and quantum dot generation/manipulation device). An example of the latter configuration is the manipulation device of the present invention being so linked to a quantum dot generating device as to allow movement of quantum dots. The quantum dots, generated in the quantum dot generating device, are transferred to the manipulation device where the dots are converted into the collection 12.

The configuration shown in FIG. 2 includes the fluid medium supply section 24 because the enclosure 22 is loaded with a fluid medium. The fluid medium is, for example, superfluid helium, but by no means limited. The fluid medium supply section 24 is not limited in specific structure in any particular manner either. Any publicly known structure, for example, the one used for the helium cryostat, may be used.

To additionally fix the nanosize objects (collection, 12, of nanosize objects) onto the substrate 30 after manipulation, the enclosure 22 is preferably provided with the substrate fixing section 25 to which the substrate 30 is fixed. The substrate fixing section 25 is not limited in specific structure in any particular manner: any publicly known substrate holder can be used that does not disrupt the fixing of the collection, 12, of nanosize objects onto the substrate 30.

The control section 26 provides a control means which controls the operation of the manipulation device of the present embodiment. The section 26 should only be capable of sending control signals to the laser beam sources 21a and 21b, the nanosize-object-collection generating section 23, and the fluid medium supply section 24 in the manipulation device as shown in FIG. 2. The section 26 also should only be capable of receiving information and signals from input means or a similar device (not shown) and controlling the operation of the means based on the signals/information. The control section 26 is not limited in specific structure in any particular manner: any suitable, publicly known, conventional computing means can be used. A specific example is a central processing unit (CPU) in a computer which operates according to a computer program.

The control operation by the control section 26 will be briefly described by way of an example. Suppose that the laser beam sources 21a and 21b illuminate the collection, 12, of nanosize objects with laser beams under different sets of conditions together. In that case, the section 26 controls the laser beam sources 21a and 21b based on the information fed through the input means so that the sources 21a and 21b can simultaneously or alternately emit different types of laser beams to achieve intended purposes. That control operation enables a greater variety of optical manipulation.

The manipulation device of the present embodiment may include output means and/or sensor means. The output means is, for example, display means (various display devices are possible) which displays various information on the manipulation of the collection, 12, of nanosize objects to the operator. The sensor means detects whether the substrate 30 is fixed to the substrate fixing section 25. Such means can be constructed from prior art technology. The means operate under the control of the control section 26.

[3] Applications of Present Invention

The present invention is of course applicable across the nanotechnology field and to the manipulation of any type of nanomaterial. A specific example is an application to the formation (production) of a quantum dot pair. That is, the present invention encompasses the method of producing a quantum dot pair based on the method of manipulating nanosize objects detailed above.

The method of producing a quantum dot pair will be described by way of a specific example. First, for example, a collection of closely positioned quantum dots with particular properties is formed, for example, by a focused beam in the collection forming step. Assume that the collection of quantum dots is a collection of numerous closely located quantum dots with particular properties (size, shape, resonance energy, etc.). Thereafter, a quantum dot pair is formed through the control of the distances between the quantum dots in the collection of quantum dots as in the first nanosize object manipulation step. In other words, as mentioned above, an attractive or repulsive force is induced between quantum dots by changing the polarization of the resonant light, so as to control the collective configuration of the collection of quantum dots. Thus, distance between the quantum dots is changed to form a quantum dot pair. Thereafter, the specific nanosize object selecting step may be carried out to select particular a quantum dot pair. Alternatively, the second nanosize object manipulation step may be carried out to fix the selected quantum dot pair to the substrate, etc. Steps other than the first nanosize object manipulation step, the second nanosize object manipulation step, the specific nanosize object selecting step, and the collection forming step may be carried out. The sequence of individual steps may be changed in any manner.

The resonant light may be shone under different sets of conditions together as mentioned above. For example, the resonant light is shone under different sets of conditions together to move only the quantum dots of a particular size in one direction and simultaneously control distance between the paired quantum dots which is less than or equal to a particular distance or less. That operation makes it possible to form a novel structure for the quantum dot pair in free space and fix the structure to the substrate.

The present invention is capable of manipulating carbon nanotubes as mentioned earlier. The radiation force exhibits different properties depending on whether the resonant light shone on a pair of parallel carbon nanotubes is polarized parallel or vertical to the length of the carbon nanotubes. Thus, attractive/repulsive force is controllable as with quantum dots. Good manipulation is realized.

The present invention will be more specifically described in reference to examples. The present invention is by no means limited by the examples. A person skilled in the art may make alterations, modifications, or other changes to the present invention without departing from its scope.

Figure 3A:
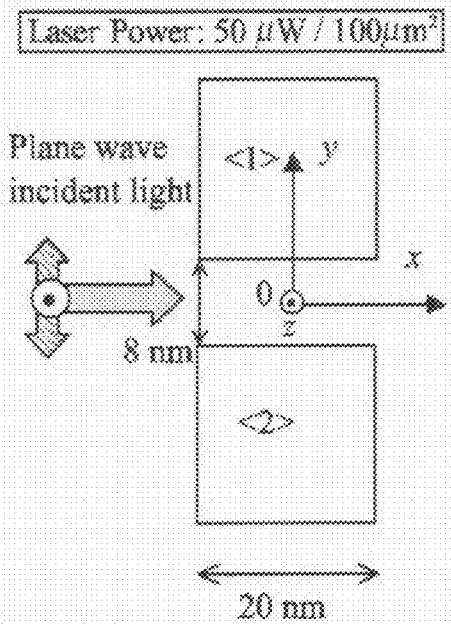
FIG. 3(a): An illustration showing the geometry of factors involved in a calculation, assuming cubic quantum dots as nanosize objects.
Figure 3B:
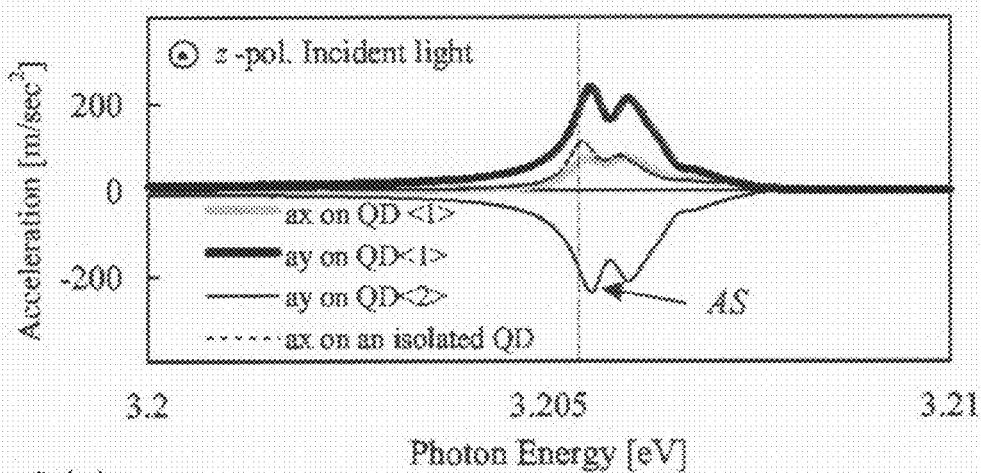
FIG. 3(b): A graph showing the frequency dependence of the x- and y-components of acceleration (force divided by mass) exerted on an individual quantum dot for different polarizations of light.
Figure 3C:
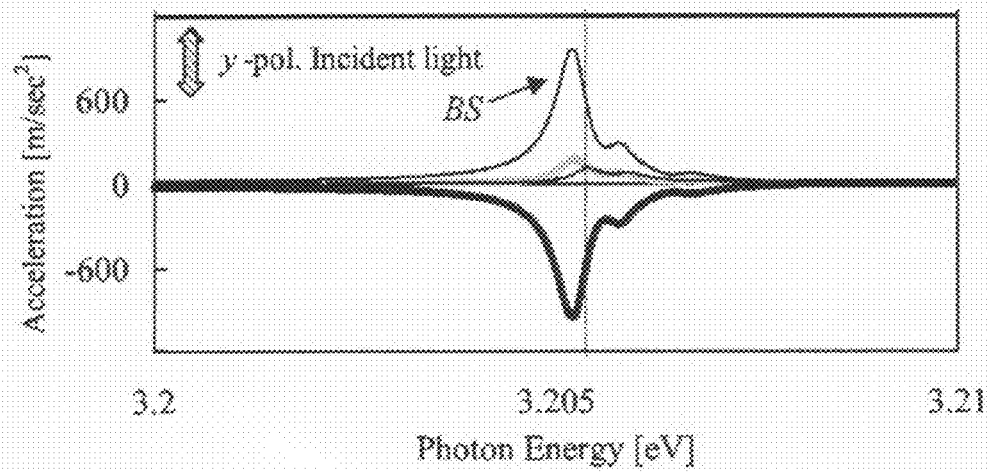
FIG. 3(c): A graph showing the frequency dependence of the x- and y-components of acceleration (force divided by mass) exerted on individual quantum dots for different polarizations of light.

CuCl semiconductor cubic quantum dots measuring 20 nm on each side were used as the nanosize objects. The electronic excited state of the semiconductor quantum dot was approximated using the Lorentz oscillator model. A response field was calculated using a discrete integral equation and substituted in the Maxwell stress tensor to calculate the force exerted on a quantum dot. Specific conditions are shown in FIG. 3($a$): the two cubic quantum dots were located so closely as 8 nm to each other. Their center of mass was supposed to be in the x-y plane. The parameter of the CuCl $Z_3$ exciton was used in the z-axis direction (resonance energy: 3.2022 eV). The resonant light (laser beam) was shone with an intensity of 50 μW/100 μm$^2$ (=50 W/cm$^2$). The resonant light was shone under this set of conditions, but with different polarizations. Frequency dependence of the x- and y-components of the acceleration (force divided by mass) acting on individual quantum dots is shown in FIGS. 3($b$) and 3($c$).

The electronic excitation levels of a single quantum dot are indicated by vertical lines in FIGS. 3($b$) and 3($c$). It is understood that if there are closely located cubic semiconductor quantum dots, polarizations induced in the dots interact through an electromagnetic field to form a "polaritonic molecule" consisting of quantum dot pairs which exhibit a bonding state (BS) or an antibonding state (AS) having different eigenenergy from the electronic excitation levels of the single quantum dots.

As two cubic quantum dots are moved closer, a repulsive force appears between the dots under resonant light polarized normal to the straight line linking the center of mass of the quantum dots (center-of-mass line), and an attractive force appears under resonant light polarized parallel to the center-of-mass line. In both cases, the magnitude of the force increases with a decrease in the distance. When the distance is reduced further to about a few nanometers, a laser with such an intensity that it would otherwise cause a linear response produces an acceleration a few tens of times as strong as gravity. In addition, with quantum dots as large as, for example, about 60 nm in size, there appears a region where normal polarization, which would inherently induce a repulsive force, produces a negative component of force under certain conditions, inducing an attractive force. With a rectangular parallelepiped fine particles, the peak value is greater with incident light polarized parallel to the long axis, and the frequency corresponding to the peak acceleration varies with the shape and polarization.

Figure 4A:
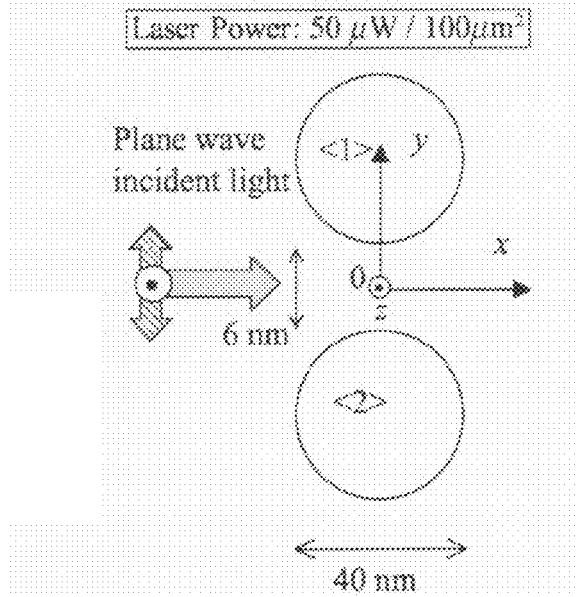
FIG. 4(a): An illustration showing the geometry of factors involved in a calculation, assuming spherical quantum dots as nanosize objects.
Figure 4B:
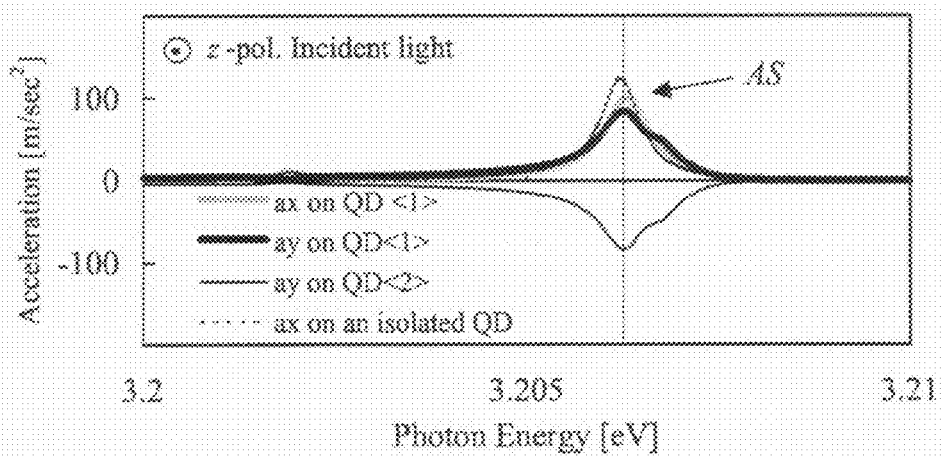
FIG. 4(b): A graph showing the frequency dependence of the x- and y-components of acceleration (force divided by mass) exerted on individual quantum dots for different polarizations of light.
Figure 4C:
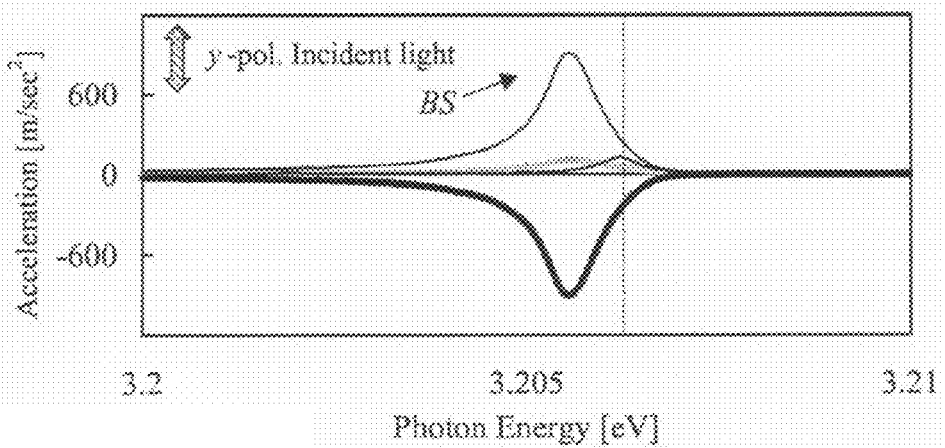
FIG. 4(c): A graph showing the frequency dependence of the x- and y-components of acceleration (force divided by mass) exerted on individual quantum dots for different polarizations of light.

Next, CuCl semiconductor spherical quantum dots measuring 40 nm in diameter were used as the nanosize objects. Similarly to the preceding case, it is understood from FIGS. 4($b$) and 4($c$) that "polaritonic molecules" which exhibit a bonding state (BS) or an antibonding state (AS) are formed. The peak of the force on a single cube under the resonant light is about as large as that on a sphere of the same volume.

The bonding and antibonding states can selectively be created with incident light of different polarizations as above. Exciting the energy to the bonding state induces the attractive force between the quantum dots; exciting the energy to the antibonding state induces the repulsive force between the quantum dots. An unconventional method of manipulating nanosize objects can be provided by exploiting these facts.

Figure 5:
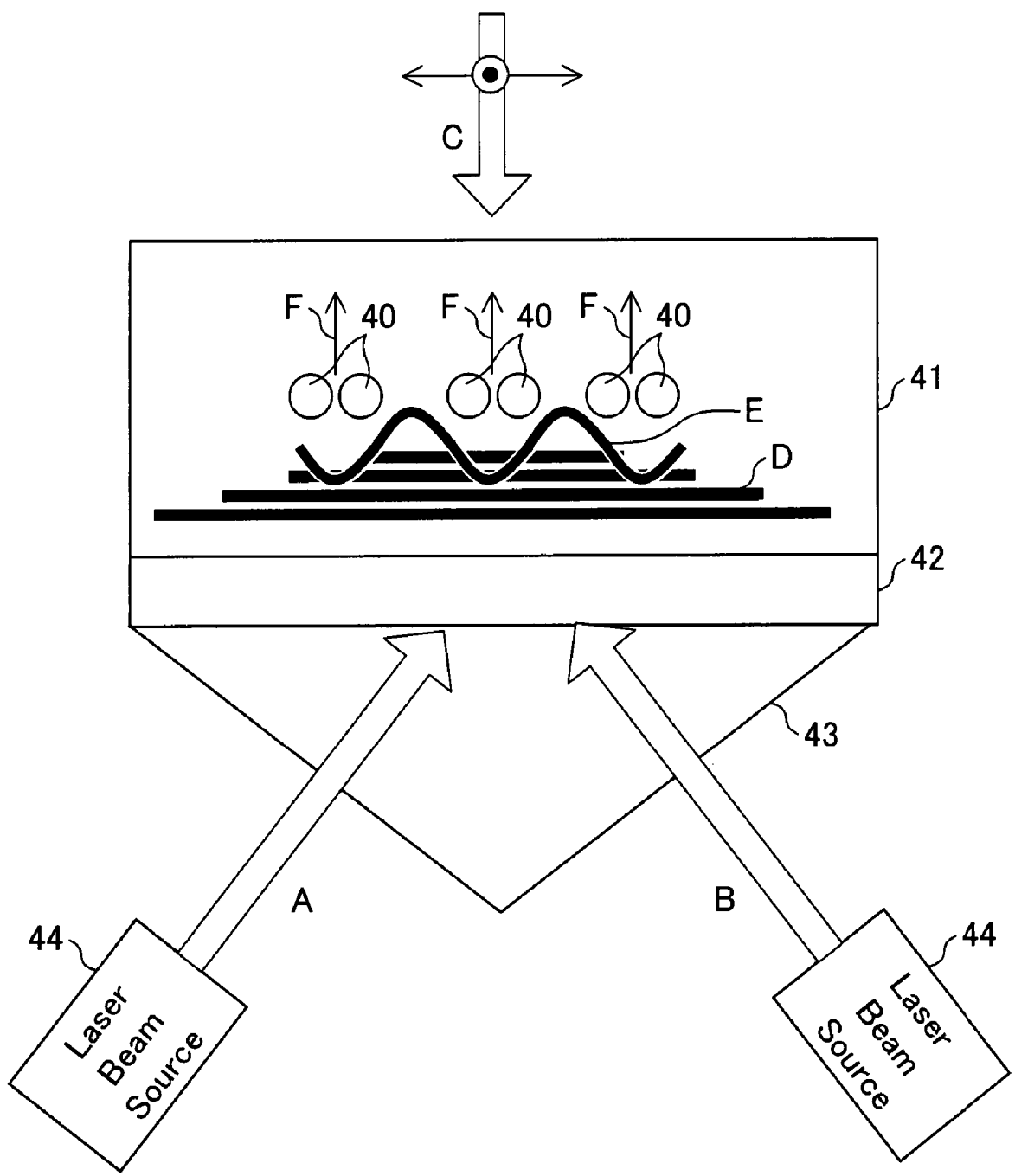
FIG. 5: An illustration of a configuration, as an example, with which to form standing wave trappings.

FIG. 5 shows a configuration example in which multiple beams are used including a standing wave. A sample cell 41 is placed right above a substrate 42. A prism 43 is attached beneath the substrate 42. The substrate 42 is provided so that quantum dot arrays, such as quantum dot pairs, are attached to it ultimately.

Inside the sample cell 41, there exist pairs of quantum dots 40 as the nanosize objects, which means that the quantum dots 40 have been selected by size.

Laser beams A and B emitted by two laser beam sources 44 facing each other illuminate the substrate 42 via the prism 43 obliquely from below the prism 43. The configuration produces a horizontal standing wave E parallel to the substrate 42. The standing wave E is a near field, which is localized at the surface of the substrate, with electric field intensity distribution like a standing wave in the horizontal direction. Due to these properties, the quantum dot pairs gather and line up periodically on the standing wave E (standing wave trapping).

An evanescent wave (light) D is produced from the same laser beams using the prism 43. The evanescent wave induces a radiation force F acting on the quantum dots 40 against gravity, thereby holding the quantum dots 40 at a fixed height above the substrate 42. It is also possible to attract the quantum dots 40 to the substrate 42 by switching the laser beams A and B between frequencies.

Standing wave trappings can be formed this way not only normal to the prism 43, but also parallel to the prism 43.

Resonant light (arrangement control light) C is shone onto the quantum dots 40 by a device (not shown) from above the sample cell 41. The light C is polarized and has an oscillation plane that is, for example, horizontal and parallel to the page (left/right direction in the figure) or horizontal and normal to the page, as indicated in the figure.

As mentioned earlier, the quantum dots 40 are being held at a fixed height above the substrate 42. The quantum dots 40 gather one-dimensionally where the potential is minimum on the standing wave E. However, if the quantum dots 40 exist in large amounts, they make a distribution in the lateral direction (in the horizontal direction). The spread of the dots 40 in the normal direction is restrained by shining the resonant light C, which is polarized in a particular manner, from above so that an attractive force is induced in the direction that is horizontal and parallel to the page. The dots 40 are distributed more one-dimensionally by allowing the collection to stretch with a repulsive force in the normal direction to the page. The dots 40 can in principle be arranged similarly to regular patterns, although the process may be time-consuming. It is also possible to attach the quantum dots 40 to the substrate 42 by further controlling near fields and the intensities of the beams. In other words, the quantum dots 40 can be attached to the substrate 42 by adjusting the position of the standing wave E or the evanescent wave D.

This control of the oscillation plane of the polarized light adjusts the parallel and normal forces to the page and modifies the distribution of the quantum dots in the lateral direction and in the normal direction to the page, thereby controlling the arrangement of the quantum dots.

Figure 6:
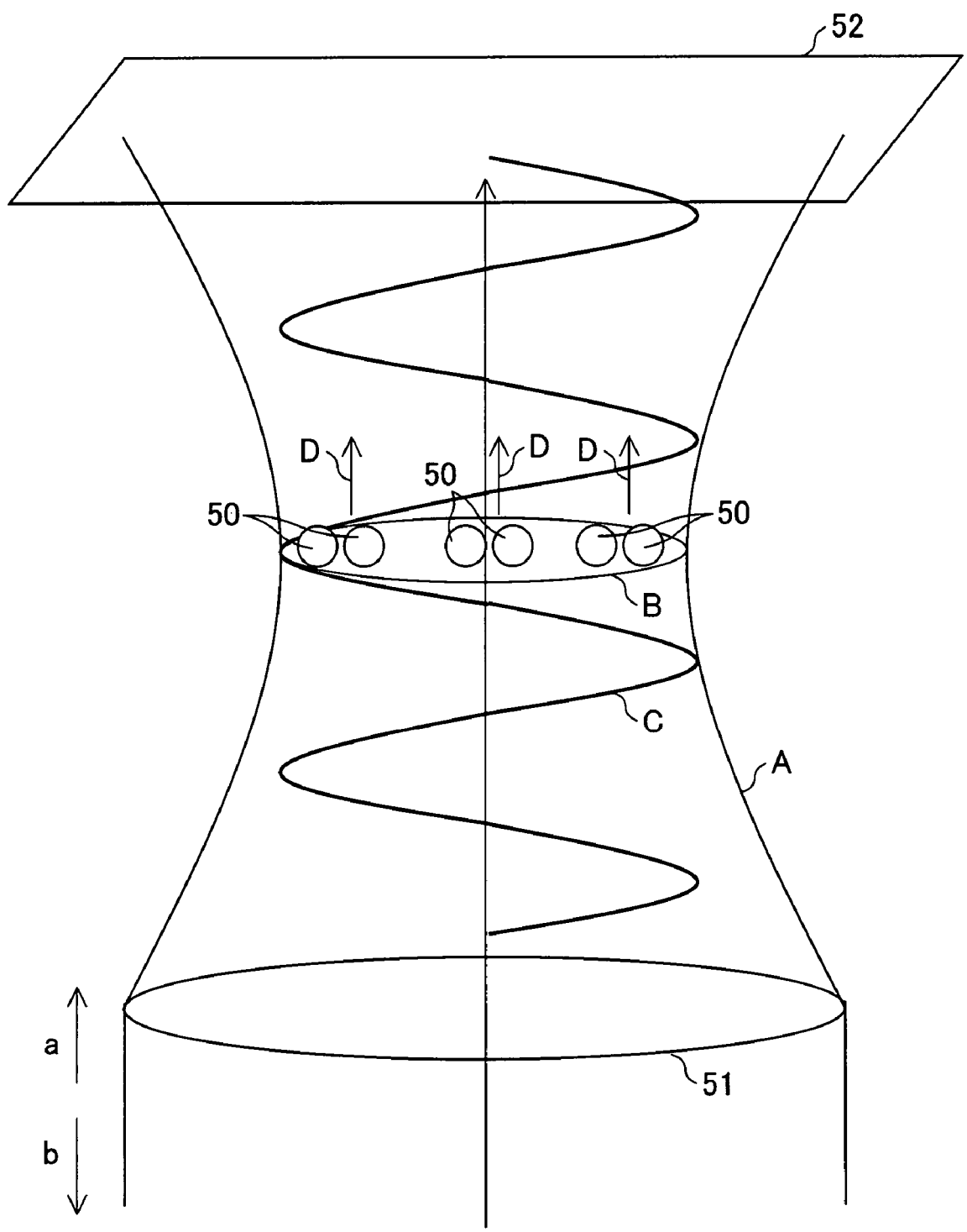
FIG. 6: An illustration of a configuration, as an example, with which to form standing wave trappings.

FIG. 6 shows another configuration example in which multiple beams are used including a standing wave. A substrate 52 is placed right above a lens 51. The substrate 52 is provided so that quantum dot arrays, such as quantum dot pairs, are attached to it ultimately.

Pairs of quantum dots 50 as the nanosize objects exist between the lens 51 and the substrate 52, which means that the quantum dots 50 have been selected by size.

Resonant light A, a focused laser beam, is focused through the lens 51 to form a laser spot B. At the same time, the resonant light A is reflected off the substrate 52 to form a standing wave C. The standing wave C induces radiation force D against gravity on all the quantum dots 50. Due to these properties, the quantum dot pairs gather and line up periodically in the plane in which the laser spot B, located at the focal point, sits (standing wave trapping).

The direction in which the quantum dots 50 gather (arrangement) is controllable by controlling the oscillation plane of the polarized resonant light A and switching between polarizations similarly to the case of FIG. 5. Thus, the dots 50 can be arranged, for example, along lines.

It is also possible to attach the quantum dots 50 to the substrate 52 by moving the lens 51 up and down (direction "a" and "b" in the figure) to control the position of the laser spot B, so that the laser spot B sits on the substrate 52.

After arranging the quantum dots 50 on the laser spot B, for example, along straight lines with the focused laser beam in this manner, the dots 50 may be attached to the substrate 52. This is applicable to the control of energy transfer between arranged quantum dots and the fabrication of quantum dot circuits.

Other possible manipulation (not illustrated) is the prevention of solidification of an entire collection system or conversely the promotion of solidification.

The embodiments and examples described in Best Mode for Carrying Out the Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

INDUSTRIAL APPLICABILITY

As described in the foregoing, the present invention enables a greater variety of more complex manipulation of a collection of nanosize objects using resonant light than conventional techniques. Therefore, through the manipulation of nanosize objects, the present invention enables the manufacture of structures having new properties and are applicable to the manipulation of biomolecules, cells, and organelle in cells. The invention is widely useable in fields related to nanotechnology.

The invention claimed is:

1. A method of manipulating nanosize objects, said method comprising:
    illuminating nanosize objects with light resonant with an electronic excitation level of the nanosize objects to induce force being exerted on the nanosize objects from the resonant light for manipulation of the nanosize objects,
    wherein:
    the resonant light illuminates a collection of nanosize objects;
    the resonant light is changed in polarization to control mechanical interaction of the nanosize objects; and
    the resonant light is changed in polarization so as to excite resonance energy of closely positioned nanosize objects to a level below resonance energy of a single nanosize object.

2. The method of claim 1, wherein a standing wave is produced to arrange the nanosize objects on the standing wave.

3. The method of claim 1, wherein a standing wave is produced to manipulate the nanosize objects, the standing wave being regulated in terms of where the standing wave is produced to attach the nanosize objects onto a substrate.

4. The method of claim 1, comprising step (a) of illuminating the nanosize objects in the collection of nanosize objects with the resonant light for manipulation of the objects, so as to control a collective motion and/or arrangement of the nanosize objects.

5. The method of claim 4, further comprising step (b) of illuminating the nanosize objects in the collection of nanosize objects with resonant light for manipulation of the objects, so as to control a position of a center of mass and/or motion of the nanosize objects of which the motion and/or arrangement are already under control.

6. The method of claim 4, further comprising step (b) of illuminating the nanosize objects with resonant light for manipulation of the objects, so as to control a position of a center of mass and/or motion of the nanosize objects before, simultaneously with, or alternately with controlling the motion and/or arrangement of the collection of nanosize objects in step (a).

7. The method of claim 1, comprising step (d) of forming the collection of nanosize objects.

8. The method of claim 7, wherein in step (d), the collection of nanosize objects is formed with focused light.

9. The method of claim 1, wherein the nanosize objects are either quantum dots or quantum dot pairs.

10. The method of claim 9, wherein:
the collection of nanosize objects contains either a plurality of types of nanosize objects having different electronic excitation levels or a plurality of types of nanosize objects of the same material, but differing in at least one of size, shape, and internal structure;
the method comprises step (c) of illuminating the nanosize objects with the resonant light to select particular nanosize objects from the collection of nanosize objects, in which step either nanosize objects with a particular electronic excitation level or nanosize objects with substantially the same size, shape, and internal structure are selected.

11. The method of claim 9, wherein:
the method comprises step (d) of forming the collection of nanosize objects; and
the collection of nanosize objects formed in step (d) is a collection of quantum dots.

12. A method of manipulating nanosize objects, said method comprising:
illuminating nanosize objects with light resonant with an electronic excitation level of the nanosize objects to induce force being exerted on the nanosize objects from the resonant light for manipulation of the nanosize objects,
wherein:
the resonant light illuminates a collection of nanosize objects;
the resonant light is changed in polarization to control mechanical interaction of the nanosize objects; and
the resonant light is changed in polarization so as to excite resonance energy of closely positioned nanosize objects to a level above resonance energy of a single nanosize object.

13. A method of manipulating nanosize objects, said method comprising:
illuminating nanosize objects with light resonant with an electronic excitation level of the nanosize objects to induce force being exerted on the nanosize objects from the resonant light for manipulation of the nanosize objects,
wherein:
the resonant light illuminates a collection of nanosize objects;
the resonant light is changed in polarization to control mechanical interaction of the nanosize objects; and
the resonant light is a laser beam A which is polarized light oscillating in a direction D1 and which covers only an energy region including a peak below resonance energy of a single nanosize object so as to induce attractive force between nanosize objects in the direction D1 and no force between nanosize objects in a direction D2, where the directions D1 and D2 are orthogonal to each other.

14. A method of manipulating nanosize objects, said method comprising:
Illuminating nanosize objects with light resonant with an electronic excitation level of the nanosize objects to induce force being exerted on the nanosize objects from the resonant light for manipulation of the nanosize objects,
wherein:
the resonant light illuminates a collection of nanosize objects;
the resonant light is changed in polarization to control mechanical interaction of the nanosize objects; and
the resonant light is a laser beam A which is polarized light oscillating in a direction D1 and which covers only an energy region including a peak above resonance energy of a single nanosize object so as to induce repulsive force between nanosize objects in a direction D2 and no force between nanosize objects in the direction D1, where the directions D1 and D2 are orthogonal to each other.

15. A method of manipulating nanosize objects, said method comprising:
Illuminating nanosize objects with light resonant with an electronic excitation level of the nanosize objects to induce force being exerted on the nanosize objects from the resonant light for manipulation of the nanosize objects,
wherein:
the resonant light illuminates a collection of nanosize objects;
the resonant light is changed in polarization to control mechanical interaction of the nanosize objects;
the resonant light, under one set of conditions, is a laser beam A which is polarized light oscillating in a direction D1 and which covers only an energy region including a peak below resonance energy of a single nanosize object so as to induce attractive force between nanosize objects in the direction D1 and no force between nanosize objects in a direction D2; and
the resonant light, under another set of conditions, is a laser beam B which is polarized light oscillating in the direction D2 and which covers only an energy region including a peak below resonance energy of a single nanosize object so as to induce attractive force between nanosize objects in the direction D2 and no force between nanosize objects in the direction D1, in order to induce attractive force between nanosize objects both in the direction D1 and in the direction D2, where the directions D1 and D2 are orthogonal to each other.

16. A method of manipulating nanosize objects, said method comprising:
illuminating nanosize objects with light resonant with an electronic excitation level of the nanosize objects to induce force being exerted on the nanosize objects from the resonant light for manipulation of the nanosize objects,
wherein:
the resonant light illuminates a collection of nanosize objects;
the resonant light is changed in polarization to control mechanical interaction of the nanosize objects;

the resonant light, under one set of conditions, is a laser beam A which is polarized light oscillating in a direction D1 and which covers only an energy region including a peak above resonance energy of a single nanosize object so as to induce repulsive force between nanosize objects in a direction D2 and no force between nanosize objects in the direction D1; and the resonant light, under another set of conditions, is a laser beam B which is polarized light oscillating in a direction D2 and which covers only an energy region including a peak above resonance energy of a single nanosize object so as to induce repulsive force between nanosize objects in a direction D1 and no force between nanosize objects in the direction D2, in order to induce repulsive force between nanosize objects both in the direction D1 and in the direction D2, where the directions D1 and D2 are orthogonal to each other.

17. A method of manipulating nanosize objects, said method comprising:

illuminating nanosize objects with light resonant with an electronic excitation level of the nanosize objects to induce force being exerted on the nanosize objects from the resonant light for manipulation of the nanosize objects, wherein:

the resonant light illuminates a collection of nanosize objects;

the resonant light is changed in polarization to control mechanical interaction of the nanosize objects;

a standing wave is produced to arrange the nanosize objects on the standing wave; and the standing wave is produced by the resonant light and reflection thereof from a substrate.

18. A method of manipulating nanosize objects, said method comprising:

Illuminating nanosize objects with light resonant with an electronic excitation level of the nanosize objects to induce force being exerted on the nanosize objects from the resonant light for manipulation of the nanosize objects, wherein:

the resonant light illuminates a collection of nanosize objects;

the resonant light is changed in polarization to control mechanical interaction of the nanosize objects; and a standing wave is produced to exert a radiation force against gravity onto the nanosize objects.

19. A method of manipulating nanosize objects, said method comprising:

illuminating nanosize objects with light resonant with an electronic excitation level of the nanosize objects to induce force being exerted on the nanosize objects from the resonant light for manipulation of the nanosize objects, wherein:

the resonant light illuminates a collection of nanosize objects;

the resonant light is changed in polarization to control mechanical interaction of the nanosize objects; and an evanescent wave is produced to exert a radiation force against gravity onto the nanosize objects.

20. A method of manipulating nanosize objects, said method comprising:

Illuminating nanosize objects with light resonant with an electronic excitation level of the nanosize objects to induce force being exerted on the nanosize objects from the resonant light for manipulation of the nanosize objects, wherein:

the resonant light illuminates a collection of nanosize objects;

the resonant light is change din polarization to control mechanical interaction of the nanosize objects;

the nanosize objects are either quantum dots or quantum dot pairs, the method comprises step (d) of forming the collection of nanosize objects;

the collection of nanosize objects formed in step (d) is a collection of quantum dots with particular properties, the method comprises step (a) of illuminating the nanosize objects in the collection of nanosize objects with the resonant light for manipulation of the objects, so as to control a collective motion and/or arrangement of the nanosize objects; and distances separating quantum dots in the collection of quantum dots are controlled to form a quantum dot pair.

* * * * *